(12) United States Patent
Potter

(10) Patent No.: US 6,816,561 B1
(45) Date of Patent: Nov. 9, 2004

(54) PHASE CORRECTION FOR MULTIPLE PROCESSORS

(75) Inventor: Michael Potter, Huntsville, AL (US)

(73) Assignee: 3Dlabs, Inc., Ltd, Hamilton (BM)

(*) Notice: Subject to any disclaimer, the term of this patent is extended or adjusted under 35 U.S.C. 154(b) by 662 days.

(21) Appl. No.: 09/633,091

(22) Filed: Aug. 4, 2000

Related U.S. Application Data

(60) Provisional application No. 60/147,723, filed on Aug. 6, 1999.

(51) Int. Cl.[7] .............................................. H04L 75/00
(52) U.S. Cl. ...................................................... 375/371
(58) Field of Search ................................. 375/371, 373, 375/374, 375, 376, 354; 327/141–163, 2–12, 71, 155, 158

(56) References Cited

U.S. PATENT DOCUMENTS

| | | | |
|---|---|---|---|
| 5,394,524 A | 2/1995 | DiNicola et al. ............ 395/163 |
| 5,557,734 A | 9/1996 | Wilson ......................... 395/162 |
| 5,570,397 A | * 10/1996 | Kubista ....................... 375/356 |
| 5,631,591 A | * 5/1997 | Bar-Niv ........................ 327/158 |
| 5,757,385 A | 5/1998 | Narayanaswami et al. .. 345/505 |
| 5,821,950 A | 10/1998 | Rentschler et al. .......... 345/505 |
| 5,841,444 A | 11/1998 | Mum et al. ................... 345/506 |
| 5,880,612 A | * 3/1999 | Kim ............................. 327/158 |
| 6,055,286 A | * 4/2000 | Wu et al. ..................... 375/375 |
| 6,075,832 A | * 6/2000 | Geannopoulos et al. ..... 375/375 |

FOREIGN PATENT DOCUMENTS

WO     WO 97/21192     6/1997     ............. G06T/1/20

* cited by examiner

*Primary Examiner*—Khai Tran
*Assistant Examiner*—Kevin M Burd
(74) *Attorney, Agent, or Firm*—Arnall Golden Gregory LLP

(57) ABSTRACT

An apparatus for processing data includes a first processor and a second processor. The first processor receives a source clock signal and converts the source clock signal to a first timing signal with a first phase. The second processor receives the source clock signal and converts the source clock signal to a second timing signal with a second phase. A phase connection circuit coupled to the first processor and the second processor determines whether the first phase is equivalent to the second phase. If the first phase and the second phase are not equivalent, the first processor will modify the first phase such that the first phase and the second phase are equivalent. The first processor may modify the first phase by inverting the first timing signal or by adding a clock delay to the first timing signal.

17 Claims, 5 Drawing Sheets

PHASE CORRECTION FOR MULTIPLE PROCESSORS

PRIORITY

This application claims priority from U.S. provisional patent application Ser. No. 60/147,723, filed Aug. 6, 1999, entitled, "PHASE CORRECTION FOR MULTIPLE PROCESSORS," the disclosure of which is incorporated herein, in its entirety, by reference.

FIELD OF THE INVENTION

The invention generally relates to data processing with parallel processors and, more particularly, the invention relates to the phase correction of timing signals of parallel data processors.

BACKGROUND OF THE INVENTION

Two or more parallel data processors commonly are utilized to more rapidly process a relatively large amount of digital data. For example, parallel processors commonly are utilized within graphics accelerators to reduce the time required to perform the many calculations associated with rasterizing a display device.

In many multi-processor data processor architectures, parallel processors cooperate by synchronizing their timing signals including both the phase and frequency of the timing signals. One known method of synchronizing timing signals utilizes an external clock that generates a master clock signal for simultaneous use by each processor. Often, however, each processor in the multi-processor data processor architecture will modify the frequency of the master clock signal. The modification of the master clock signal may be necessary because, for example, the master clock frequency is faster than the processor to processor communication frequency. As a result of this modification, it is possible for the modified timing signals of each processor to have identical frequencies but different phases. This is illustrated in FIG. 1, which shows an example of a master clock signal 10 and the possible modified clock signals which can be obtained by dividing the master clock signal frequency in half (f/2). Half frequency clock 12 and half frequency clock 14 are 180° out of phase. Therefore, if each processor in the multi-processor system reduced the frequency of the master clock signal by half to produce a timing signal, it is possible for each processor to have a timing signal either in phase or 180° out of phase with respect to any other processor. In order to coordinate their respective processing tasks, however, each processor should have a timing signal with an identical frequency and phase.

SUMMARY OF THE INVENTION

In accordance with one aspect of the invention, an apparatus for processing data includes a first processor which receives a source clock signal and converts the source clock signal to a first timing signal with a first phase and a second processor which receives the source clock signal and converts the source clock signal to a second timing signal with a second phase. A first phase correction circuit is coupled to the first processor and the second processor, the phase correction circuit determining whether the first phase is equivalent to the second phase. If the first phase and the second phase are not equivalent, the first processor modifies the first phase so that the first phase and the second phase are equivalent.

In a preferred embodiment, the difference between the first phase and the second phase is determined by transmitting a first phase correction signal from the first processor to the second processor via the first phase correction circuit and transmitting the first phase correction signal from the second processor back to the first processor via the first phase correction circuit. The difference between the first phase and the second phase may be determined by the total transmission time for the first phase correction signal. In a preferred embodiment, the first processor modifies the first phase by inverting the first timing signal. Alternatively, the first processor may modify the first phase by adding a clock delay to the first timing signal.

In accordance with another preferred embodiment, the apparatus further includes a third processor that receives the source clock signal and converts the source clock signal to a third timing signal with a third phase and a second phase correction circuit coupled to the second processor and the third processor. The second phase correction circuit determines whether the second phase is equivalent to the third phase. If the second phase and the third phase are not equivalent, the second processor modifies the second phase and the third phase such that the second phase and the third phase are equivalent.

BRIEF DESCRIPTION OF THE DRAWINGS

The foregoing and other objects and advantages of the invention will be appreciated more fully from the following further description thereof with reference to the accompanying drawings wherein.

DESCRIPTION OF PREFERRED EMBODIMENTS

Figure 2:
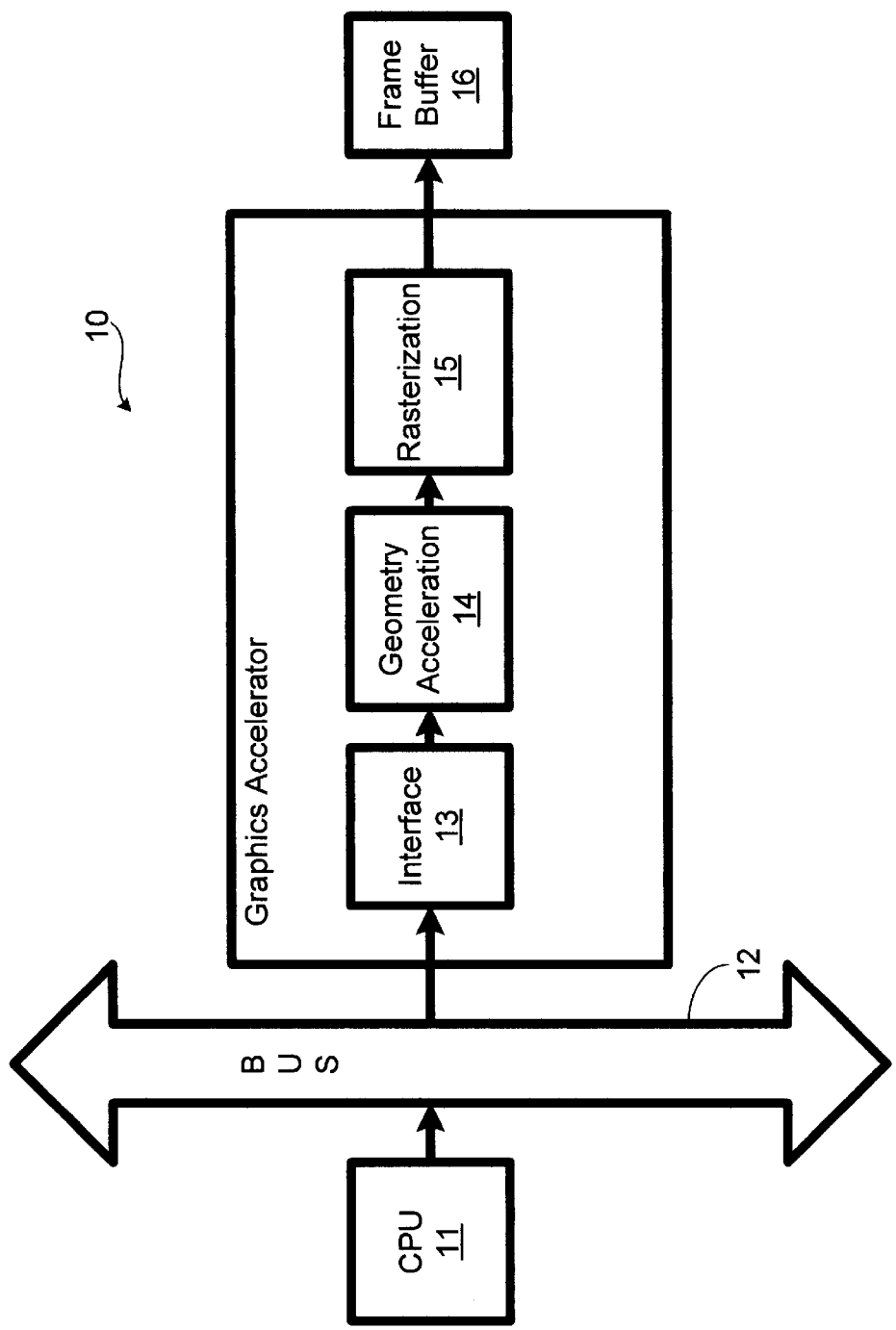
FIG. 2 schematically shows an exemplary multi-processor graphics accelerator on which preferred embodiments of the invention may be implemented.

In accord with preferred embodiments of the invention, a plurality of processors in a multi-processor data processing device utilize an external high frequency clock to drive all of the processors. FIG. 2 schematically shows an exemplary multi-processor graphics accelerator 10 on which preferred embodiments of the invention may be implemented. It should be noted that although a graphics accelerator 10 is shown, principles of the invention may be applied to other multi-processor data processing architectures.

Figure 3:
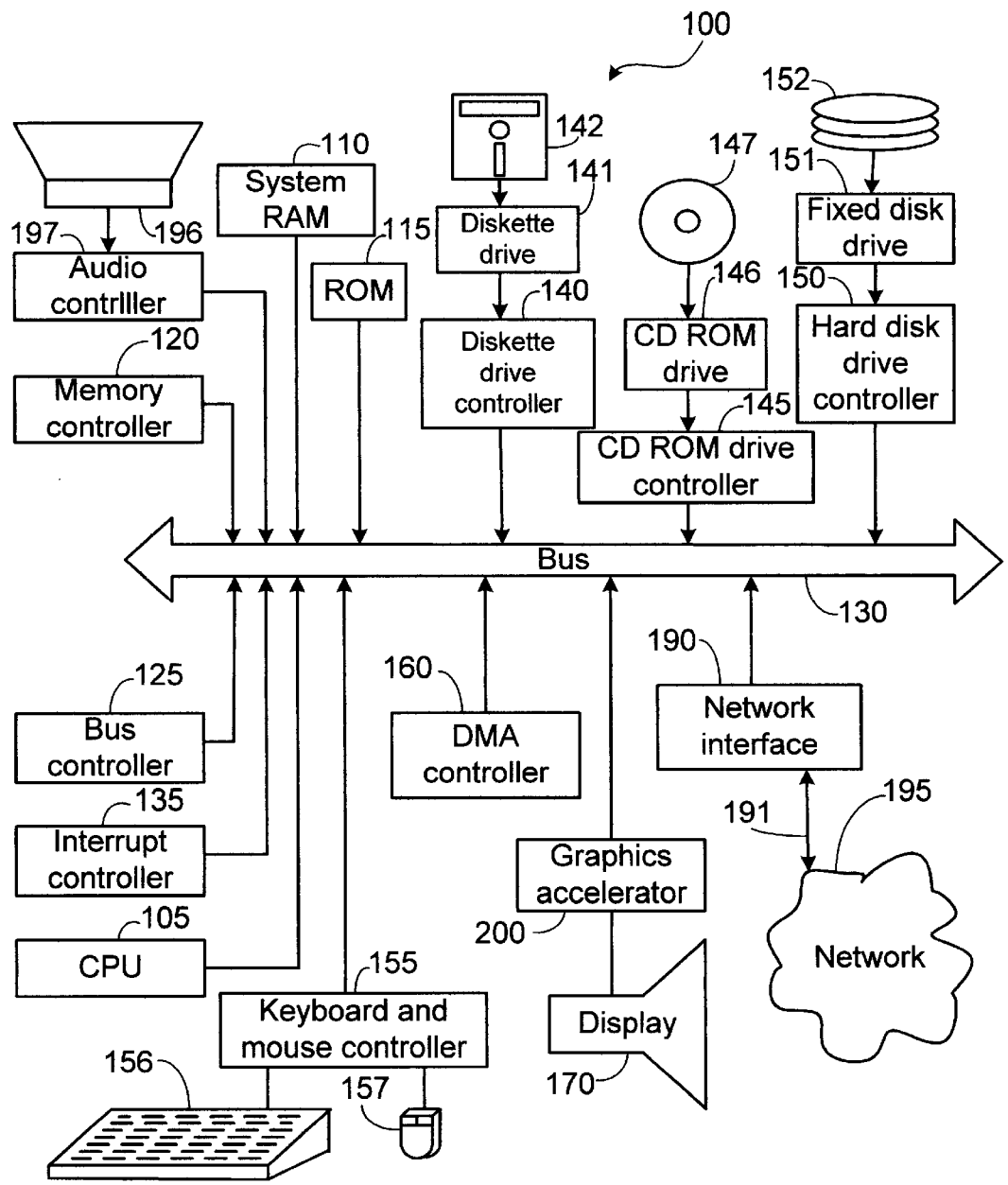
FIG. 3 schematically shows the system architecture of an exemplary computer system on which preferred embodiments of the invention may be implemented.

The graphics accelerator 10 preferably is utilized within a computer system (e.g., an Intergraph EXTREME-Z™ graphics workstation, distributed by Intergraph Corporation of Huntsville, Ala.) that displays relatively complex graphics on a display device (not shown). FIG. 3 illustrates the system architecture for an exemplary computer system on which the disclosed apparatus for processing data may be implemented. The exemplary computer system of FIG. 3 is discussed for descriptive purposes only, however, and should not be considered a limitation of the invention. Although the description below may refer to terms commonly used in describing particular computer systems, the described concepts apply equally to other computer systems, including systems having architectures that are dissimilar to that shown in FIG. 3.

The computer 100 includes a central processing unit (CPU) 105 having a conventional microprocessor, random access memory (RAM) 110 for temporary storage of information, and read only memory (ROM) 115 for permanent storage of read only information. A memory controller 100 is provided for controlling system RAM 110. A bus controller 125 is provided for controlling a bus 130, and an interrupt controller 135 is provided for receiving and processing various interrupt signals from the other system components.

Mass storage may be provided by known non-volatile storage media, such as a diskette 142, a digital versatile disk (not shown), a CD-ROM 147, or a hard disk 152. Data and software may be exchanged with the computer system 100 via removable media, such as the diskette 142 and the CD-ROM 147. The diskette 142 is insertable into a diskette drive 141, which utilizes a diskette drive controller 140 to interface with the bus 130. Similarly, the CD-ROM 147 is insertable into a CD-ROM drive 146, which utilizes a CD-ROM drive controller 145 to interface with the bus 130. Finally, the hard disk 152 is part of a fixed disk drive 151, which utilizes a hard drive controller 150 to interface with the bus 130.

User input to the computer 100 may be provided by a number of devices. For example, a keyboard 156 and a mouse 157 may be connected to the bus 130 by a keyboard and mouse controller 155. An audio transducer 196, which may act as both a microphone and a speaker, is connected to the bus 130 by audio controller 197. It should be obvious to those reasonably skilled in the art that other input devices, such as a pen and/or tablet and a microphone for voice input, may be connected to computer 100 through bus 130 and an appropriate controller. A direct memory access (DMA) controller 160 is provided for performing direct memory access to system RAM 110. A visual display may be generated by a graphics accelerator 200 that controls a display device 170. The display device 170 preferably is a conventional horizontal scan cathode ray tube ("CRT") monitor having a plurality of pixels. The pixels are arranged in a two-dimensional X-Y grid and are selectively lit, as directed by the graphics accelerator 200, for displaying an image. The display device 170 may be, for example, an IBM G72 General Series Monitor, distributed by International Business Machines Corporation of Armonk, New York.

A network adapter 190 also may be included that enables the computer system 100 to connect to a network 195 via a network bus 191. The network 195, which may be a local area network (LAN), a wide area network (WAN), or the Internet, may utilize general purpose communication lines that interconnect a plurality of network devices.

The computer system 100 preferably is controlled and coordinated by operating system software, such as the WINDOWS NT® operating system (available from Microsoft Corp., of Redmond, Wash.). Among other computer system control functions, the operating system controls allocation of system resources and performs tasks such as process scheduling, memory management, networking, and I/O services.

Returning to FIG. 2, the graphics accelerator 10 preferably includes an bus interface 13 for interfacing with the system bus 12. The system bus 12 delivers commands from the central processing unit 11 to the graphics accelerator 10. The graphics accelerator 10 also includes a geometry acceleration stage 14 that receives incoming triangle vertex data from the bus interface 13 and, based upon such incoming data, calculates attribute data (e.g., color, depth, transparency, intensity, coordinates of the vertices on the display device, etc . . . ) for each of the vertices of triangles utilizing known tessellation techniques, and a rasterization stage 15 for calculating attribute data for the pixels within each triangle based upon the vertex attribute data. The rasterization stage 15 forwards the calculated pixel data to a frame buffer 16 for display on a display device. The graphics accelerator preferably includes a plurality of parallel processing units, for example a plurality of rasterizers within the rasterization stage 15. The plurality of processing units divide the graphics processing in an efficient manner among processors. Accordingly, graphics request streams may be more rapidly processed by the display device. Among other ways, preferred embodiments of the invention may be implemented either using multiple graphics accelerators 10, or multiple processors within one of the stages of the graphics accelerator 10.

Figure 4:
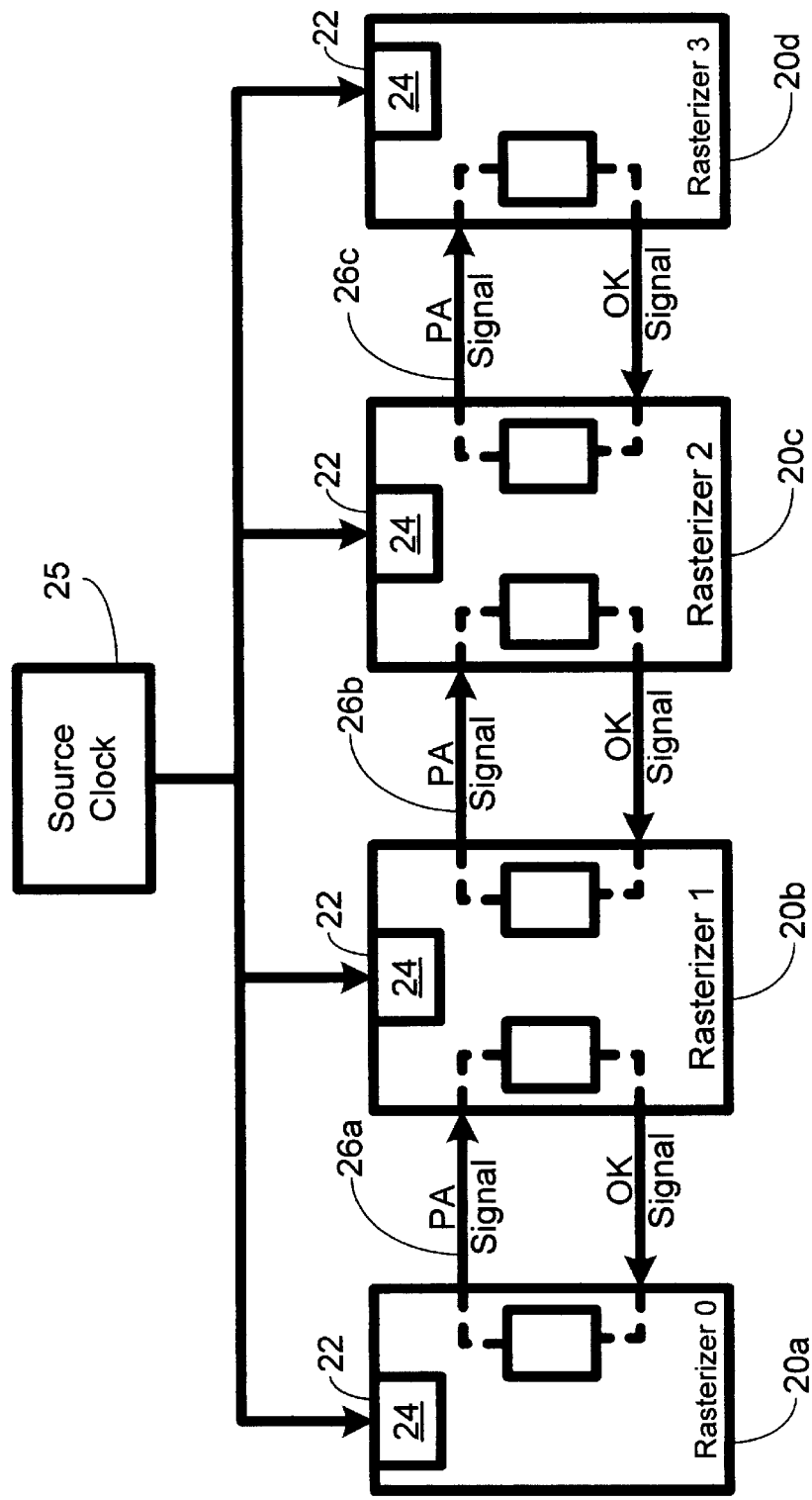
FIG. 4 schematically shows a plurality of graphics processors that implement preferred embodiments of the invention.

FIG. 4 schematically shows one implementation of the rasterization stage 15, in which a plurality of rasterizers 20a–d operate in parallel in accord with preferred embodiments of the invention. Of course, principles of preferred embodiments of the invention may be applied to other stages or other parallel processors used in a computer system. The plurality of rasterizers 20a–d thus is shown as an exemplary implementation of preferred embodiments of the invention. In preferred embodiments, the rasterizers 20a–d may be those disclosed in copending provisional U.S. patent application entitled, "MULTTI-PROCESSOR GRAPHICS ACCELERATOR", filed on Jul. 15, 1999 as Ser. No. 09/354, 462, the disclosure of which is incorporated herein, in its entirety, by reference.

Figure 1:
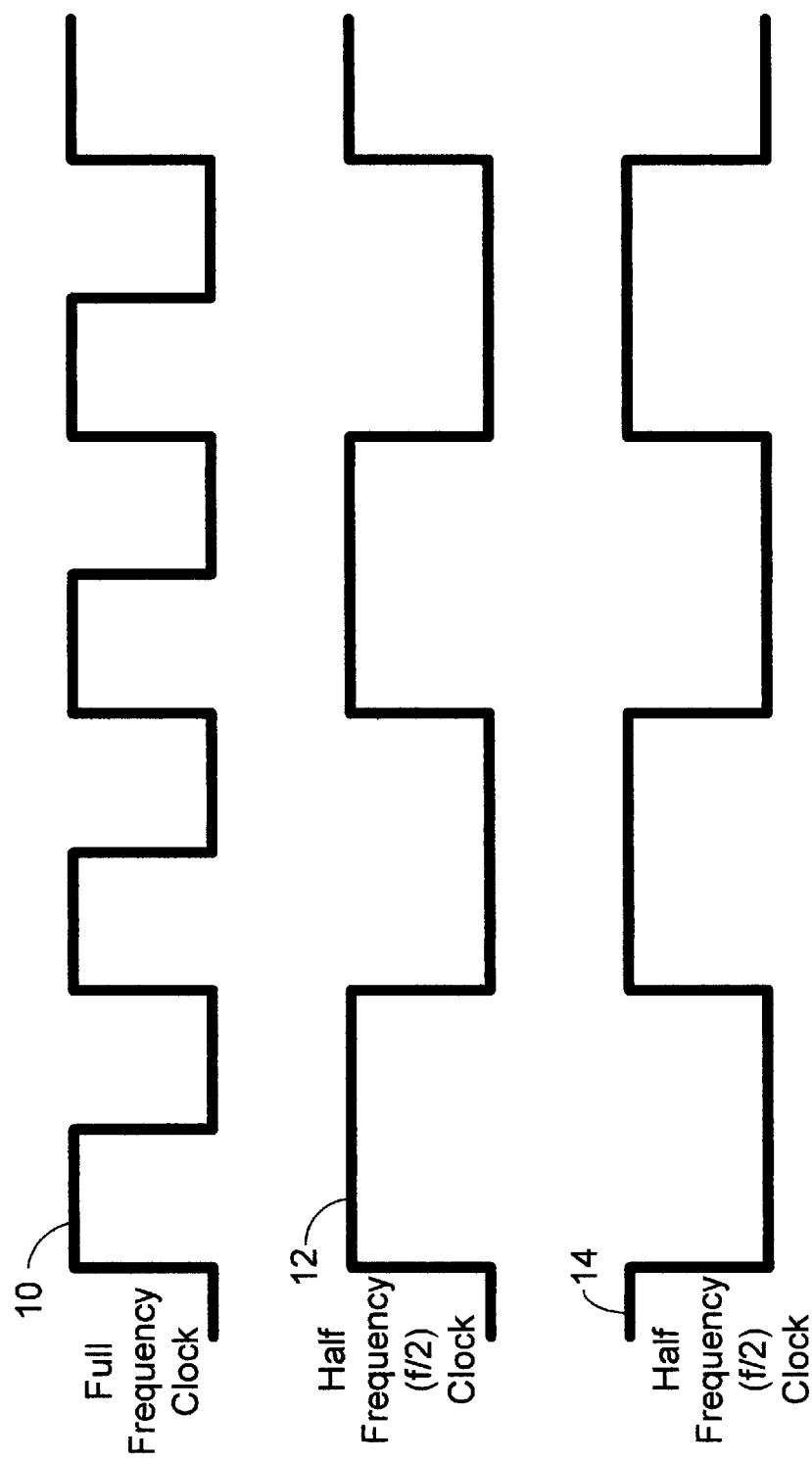
FIG. 1 shows an example of a full frequency clock signal and the half frequency clock signals which may be derived from the full frequency clock signal.

Each rasterizer 20a–d preferably includes logic for processing graphical data (not shown), an input 22 for receiving a source clock signal 25, an internal divide by clock 24 to modify the frequency of the source clock signal, and a phase correction circuit 26a–c to correct the phase of the timing signals produced by the internal divide by clocks 24. The divide by clocks 24 may be, for example, a divide by two clock. It should be noted, however, that in the following description a divide by two clock is used merely as an exemplary implementation of a preferred embodiment of the invention. The divide by clocks 24 could also be, for example, divide by four or divide by eight clocks. Each divide by two clock 24 divides the frequency, f, of the source clock signal 25 by two to produce a timing signal. As discussed above with respect to FIG. 1, however, since each rasterizer 20a–d produces its own divide by two timing signal, each rasterizer 20a–d timing signal could either be in phase or 180° out of phase with respect to any of the other rasterizer 20a–d timing signal.

In accordance with preferred embodiments, a first phase correction circuit 26a is coupled to rasterizer 20a and rasterizer 20b, a second phase correction circuit 26b is coupled to rasterizer 20b and rasterizer 20c and a third phase correction circuit 26c is coupled to rasterizer 20c and rasterizer 20d. Each phase correction circuit 26a–d is utilized to determine whether the timing signals created by the internal divide by clocks 24 of each rasterizer 20a–d are in phase. In a preferred embodiment, the phase of the timing signal for rasterizer 20d is used as the "parent"(or base) for correcting the phase of the timing signals of rasterizers 20a–d. Accordingly, the timing signal phase of rasterizer 20d is not corrected. Rasterizer 20c modifies, if necessary, the phase of its timing signal to match the phase of the timing signal for rasterizer 20d using phase correction circuit 26c. In turn, rasterizer 20b modifies, if necessary, the phase of its timing signal to match the phase of the timing signal rasterizer 20c using phase correction circuit 26b. And finally, rasterizer 20a modifies, if necessary, the phase of its timing signal to match the phase of the timing signal of rasterizer 20b using phase correction circuit 26a. Phase correction circuits 26a–c are separate but identical circuits. In this manner, the phase of the timing signals of each rasterizer 20a–d may be synchronized.

Figure 5:
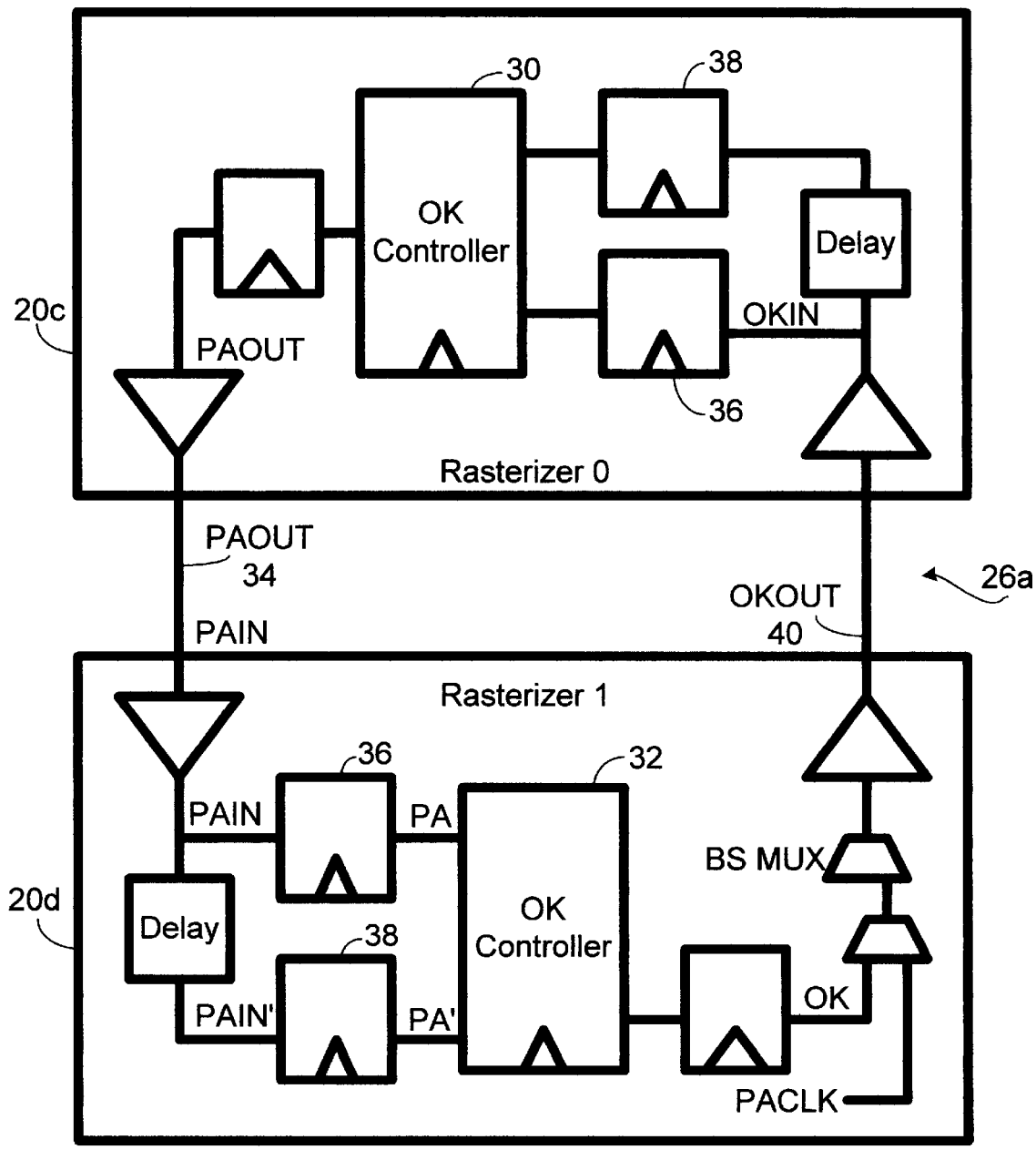
FIG. 5 schematically shows the phase correction circuit in accordance with preferred embodiments of the invention.

The operation of phase correction circuits 26a–d will be discussed in more detail with respect to FIG. 5. FIG. 5 shows the details of a preferred phase correction circuit 26c which is coupled between rasterizer 20c and rasterizer 20d. As mentioned above, phase correction circuits 20a–c preferably are identical. In FIG. 5, a controller 30 of rasterizer 20c transmits a phase correction signal ("PA") to rasterizer 20d via the output terminal PAout 34. The phase correction signal, PA, is sent from the output terminal PAout 34 to the input terminal PAin of rasterizer 20d. The receiving side of the phase correction circuit in rasterizers 20c and 2d includes a normal receiving register 36 and a data delayed receiving register 38. The two receiving registers 36 and 38 are used to identify and correct setup failures in receiving the phase correction signal. If a setup failure occurs, the data captured by the normal receiving register 36 will differ from the data captured by the data delayed receiving register 38. When a difference occurs, the controllers 30 and 32 may insert a one clock cycle wait in order to ensure that the setup is successful (i.e., the data captured by the normal receiving register and the data delayed receiving register are the same).

Once the setup is successful, controller 32 of rasterizer 20d, receives the phase correction signal PA and sends it back to rasterizer 20c as an OK signal. Controller 32 and controller 30 are preferably data sampling devices such as a flip flop which will sample the data signal on the riding edge of the timing signal for the respective processor and transfer the signal to its output. Controller 32 passes the phase correction signal (OK) back to rasterizer 20c via the output terminal OKOUT 40. As mentioned above, the phase correction circuit in rasterizer 20c also includes a normal receiving register 36 and a delayed receiving register 38 to ensure successful setup of the signal.

The controller 30 determines whether the timing signals of rasterizer 20c and rasterizer 20d are in phase based on the total transmission time (i.e., the number of clock cycles) for the phase correction signal to return to controller 30 as the OK signal. If the timing signals of rasterizer 20c and rasterizer 20d are in phase, the total transmission time of the phase correction signal will be a predetermined value, for example 2 clock cycles. If the total transmission time is greater than or less than this pre-determined value, controller 30 recognizes that the timing signals are out of phase. If the timing signals are out of phase, rasterizer 20c will modify its timing signal such that it is in phase with the timing signal of rasterizer 20d.

In a preferred embodiment, rasterizer 20c corrects the phase by inverting the timing signal. Alternatively, the phase of the timing signal of rasterizer 20c may be corrected by controller 30 adding a clock delay to the timing signal.

Returning to FIG. 4, the phase of the timing signals of rasterizers 20a and 20b may be corrected in the same manner using the respective phase correction circuits. As discussed above, rasterizer 20c will send a phase correction signal to rasterizer 20d through the phase correction circuit 26c. Rasterizer 20c corrects the phase of its timing signal based on the phase of the timing signal of rasterizer 20d. At the same time, rasterizer 20b sends a phase correction signal to rasterizer 20c thorough phase correction circuit 26b. Rasterizer 20b corrects the phase of its timing signal based on the phase of the timing signal of rasterizer 20c. In addition, rasterizer 20a will, at the same time, send a phase correction signal to rasterizer 20b through phase correction circuit 26a. Rasterizer 20a corrects the phase of its timing signal based upon the phase of the timing signal of rasterizer 20b. This process will continue until the phase of each rasterizer 20a–d timing signal is the same.

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

I claim:

1. An apparatus for processing data, the apparatus comprising:
    a first processor having a first clock input that receives a source clock signal, the first processor converting the source clock signal to a first timing signal, the first timing signal having a first phase;
    a second processor having a second clock input that receives the source clock signal, the second processor converting the source clock signal to a second timing signal, the second timing signal having a second phase; and
    a first phase correction circuit operatively coupled with the first processor and the second processor, the first phase correction circuit determining whether the first phase is equivalent to the second phase;
    wherein if the first phase and the second phase are not equivalent, the phase of the second timing signal is modified and the first timing signal remains unchanged such that the first phase and the second phase are equivalent.

2. An apparatus according to claim 1, further including:
    a third processor having a third clock input that receives the source clock signal, the third processor converting the source clock signal to a third timing signal having a third phase; and
    a second phase correction circuit coupled to the second processor and the third processor, the second phase correction circuit determining whether the second phase is equivalent to the third phase;
    wherein if the second phase and the third phase are not equivalent, the phase of the second timing signal is modified such that the second phase and the third phase are equivalent.

3. An apparatus according to claim 1, wherein the first processor transmits a first phase correction signal to the second processor via the first correction circuit and the second processor transmits the first phase correction signal back to the first processor via the first phase correction circuit such that a difference between the first phase and the second phase may be determined.

4. An apparatus according to claim 1, wherein the first processor modifies the first phase by inverting the first timing signal.

5. An apparatus according to claim 1, wherein the first processor modifies the first phase by adding a clock delay to the first timing signal.

6. An apparatus according to claim 3, wherein a difference in the first phase and the second phase is determined by the total transmission time for the first phase correction signal.

7. An apparatus according to claim 2, wherein the second processor transmits a second phase correction signal to the third processor via the second phase correction circuit and the third processor transmits the second phase correction circuit back to the second phase correction circuit via the second phase correction circuit such that a difference between the second phase and the third phase may be determined.

8. An apparatus according to claim 2, wherein the second processor modifies the second phase by inverting the second timing signal.

9. An apparatus according to claim 2, wherein the second processor modifies the second phase by adding a clock delay to the second timing signal.

10. An apparatus according to claim 7, wherein a difference in the second phase and the third phase is determined by the total transmission time of the second phase correction signal.

11. A data processor comprising:
    a first processor having a first clock signal with a first phase;
    a second processor having a second clock signal with a second phase;
    a third processor having a third clock signal with a third phase;
    a first phase correction circuit coupled to the first processor and the second processor, the first phase correction circuit determining whether the first phase and the second phase are equivalent; and
    a second phase correction circuit coupled to the second processor and the third processor, the second phase correction circuit determining whether the second phase and the third phase are equivalent;
    wherein if the second phase and the third phase are not equivalent, the phase of the second clock signal is modified and the third clock signal remains unchanged, and if the first phase and the second phase are not equivalent, the phase of the first clock signal is modified and the second clock signal remains unchanged.

12. A data processor according to claim 11, wherein the second processor modifies the second phase by inverting the second clock signal.

13. A data processor according to claim 11, wherein the first processor modifies the first phase by inverting the first clock signal.

14. A data processor according to claim 11, wherein the second processor modifies the second phase by adding a clock delay to the second clock signal.

15. A data processor according to claim 11, wherein the first processor modifies the first phase by adding a clock delay to the first clock signal.

16. A phase correction circuit for correcting timing signals in two different data processing circuits, comprising:
    a first controller in a first data processing circuit for outputting a phase correction signal;
    a second receiving unit in a second data processing circuit for receiving the phase correction signal from the first data processing circuit, wherein the second receiving unit outputs a unmodified phase correction signal and a delayed phase correction signal;
    a second controller in the second data processing circuit for receiving the unmodified phase correction signal and the delayed phase correction signal, wherein, if the unmodified phase correction signal differs from the delayed phase correction, then the second controller inserts a delay;
    a first receiving unit in the first data processing circuit for receiving the phase correction signal from the second controller,
    wherein the first controller determines if a first timing signal of the first data processing circuit and a second timing signal of the second data processing circuit are in phase,
    if they are not in phase, then the first controller modifies the first timing signal such that the first timing signal is in phase with the second timing signal.

17. The phase correction circuit of claim 16, wherein the first receiving unit further comprising:
    a receiving register for receiving the phase correction signal and outputting the unmodified phase correction signal;
    a delay element for receiving the phase correction signal; and
    a delayed register for receiving a delayed signal from the delay element and outputting the delayed phase correction signal.

* * * * *